(12) United States Patent
Kudo et al.

(10) Patent No.: US 7,625,511 B2
(45) Date of Patent: Dec. 1, 2009

(54) METHOD AND DEVICE FOR FORMING TIRE'S ANNULAR MEMBER

(75) Inventors: Shigeo Kudo, Osaka (JP); Toshiyuki Tanaka, Osaka (JP); Tetsuo Tatara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 794 days.

(21) Appl. No.: 11/135,071

(22) Filed: May 23, 2005

(65) Prior Publication Data
US 2006/0055082 A1    Mar. 16, 2006

(30) Foreign Application Priority Data
Sep. 10, 2004    (JP) .............................. 2004-264621

(51) Int. Cl.
  *B29D 30/00*    (2006.01)
  *B29C 41/20*    (2006.01)
(52) U.S. Cl. .................. 264/279; 156/124; 156/422; 264/310; 425/117; 425/327; 425/395; 425/402
(58) Field of Classification Search .............. 264/166, 264/310, 326, 323, 325, 271.1, 279; 425/34.2, 425/383, 385, 516, 110, 117, 327, 395, 402; 156/123, 124, 394.1, 136, 422
See application file for complete search history.

(56) References Cited

U.S. PATENT DOCUMENTS 4,983,239 A * 1/1991 Holroyd et al. .............. 156/123

FOREIGN PATENT DOCUMENTS

| JP | 1-314151 | 12/1989 |
|---|---|---|
| JP | 2002-187218 | 7/2002 |

* cited by examiner

*Primary Examiner*—Mathieu D. Vargot
(74) *Attorney, Agent, or Firm*—Jordan and Hamburg LLP

(57) ABSTRACT

A method and device for manufacturing tire's annular member having a stretch mainly in radial direction by use of simple devices and simple way of pressing with high precision and easiness, as to produce tire product in high quality with no fluctuation of mass and/or uniformity, comprising: a first mold including a profile mold having an annular recess; a second mold which faces the first mold; and an extruder that continuously extrudes a rubber body into the recess of the profile mold. Concurrent with such extruding, the profile mold is rotated by one turn so as to charge the rubber body into the annular recess in a manner as annularly continuous. Then, the first and the second molds are brought abut each other so as to press the rubber body between the profile and second molds; thus shaping the rubber body into a shape defined by the profile mold.

7 Claims, 12 Drawing Sheets

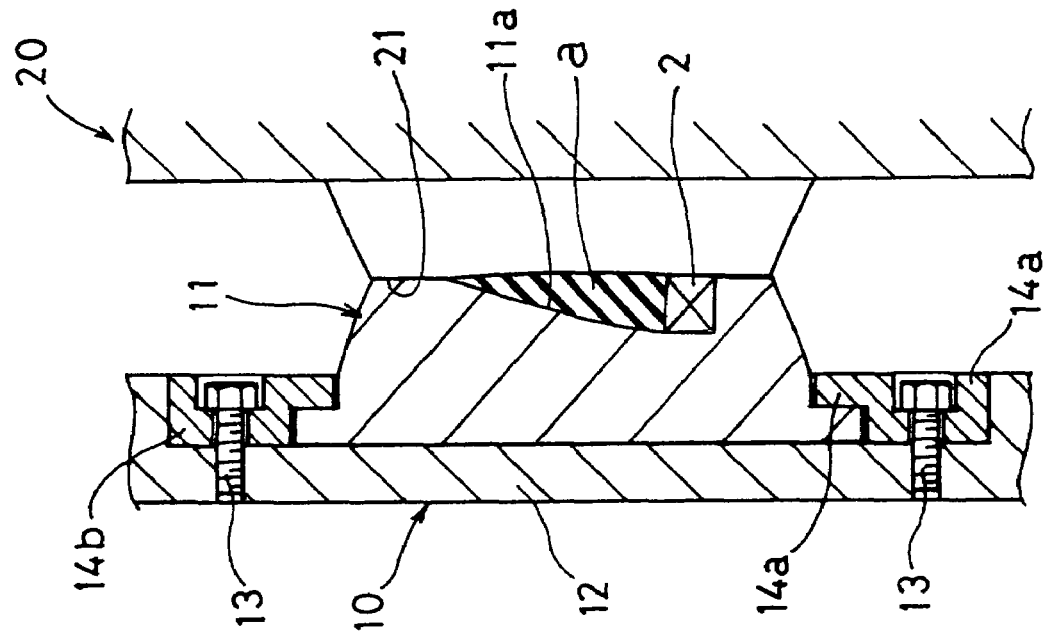

F I G. 14
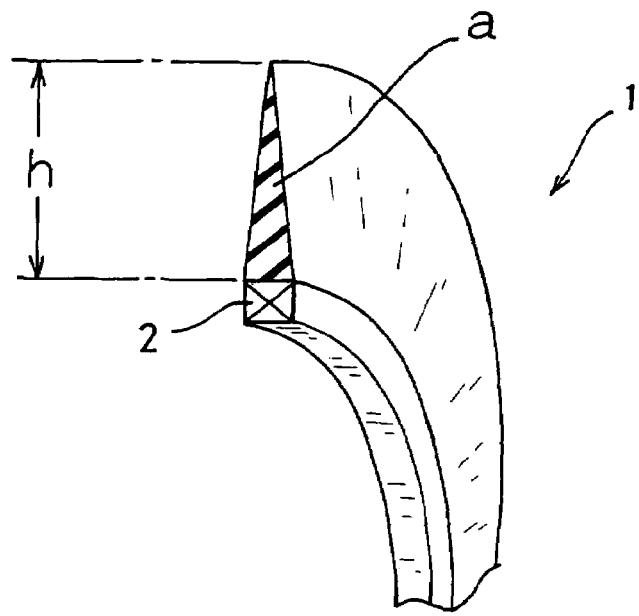

METHOD AND DEVICE FOR FORMING
TIRE'S ANNULAR MEMBER

TECHNICAL FIELD

The present invention relates to a method and device for forming tire's annular members.

BACKGROUND ART

For forming a bead filler for example, which is illustrated in FIG. 14 and is assembled into bead portions of a tire, following method is generally taken. Firstly, a ribbon of to-be-vulcanized rubber material is extruded in a predetermined sectional shape by an extruder, and then cut into a certain length. Subsequently, such cut ribbon of the rubber is bonded onto outer circumferential face of a bead's reinforcing member such as a wire that has been preliminary shaped as a ring, while ends of the cut ribbon of the rubber are bonded together.

In above method of cutting into a certain length and then bonding, precision for forming is labile due to surging or pulsation during extrusion or bonding. This might cause fluctuation and irregularities in weight and/or uniformity of tire products and thus adversely affect quality assurance.

In a case shown in FIG. 15 for example, an elongated rubber body "a" is extruded in a substantially triangular or wedge-shaped cross section that is elongated or widened in a radial direction of a tire. The elongated rubber body "a" is then wound, and is cut accordingly, around an outer circumferential face of the bead's reinforcing member 2, followed by butt-wise joining and bonding of ends "e" of the cut rubber member. In this case, tensile strain is formed all over the elongated rubber body "a" as highest in its outer periphery. Thus, the elongated rubber body "a" is prone to detaching and parting from the bead's reinforcing member, the more the closer to the ends "e". The detaching and parting is made as indicated by chain lines in FIG. 15 for example, thus damaging the balance of tire product. Moreover, the elongated rubber body "a" forms a jutting out at joined ends "e", thus causing irregularity in rubber distribution and the like. Therefore, uniform ones of tire's annular members are not obtainable. These drawbacks become more apparent when widthwise radial dimension or height "h" of the tire's annular member is increased. With increase of the width-wise radial dimension, the tire's annular member becomes more liable to collapse; and hence, the radial dimension or height "h" should be restricted.

In otherwise, the rubber member having been extruded and cut in a certain length is wound around a drum to form a ring or tube and then expanded in radial direction. In this case, expanding at outer periphery of the rubber member is large, thus shaping and dimensions of the rubber member becomes labile.

In view of above, various methods for overcoming the drawbacks attributed to the above-mentioned cutting into a given size have been proposed. For example, JP-A-2002-187218 discloses a method for forming a bead filler or the like in an annular shape, in which a bead's reinforcing member is placed on a rotating plate; and extruded rubber body is supplied to the outer circumferential face of the bead's reinforcing member while rotating the plate. Subsequently, the rubber body is pressed and formed into a given shape using a tool and, at the same time, is bonded to the bead's reinforcing member while ends of the formed rubber member are joined together. In this method of forming a bead filler, rubber body is extruded onto a rotating plate and almost simultaneously a tool is applied as to scrape the rubber body. Thus, shaping is prone to being erratic and high precision is not achieved. Moreover, seam portion of joined ends may also be erratic and might have rubber residue or fragment not used.

Meanwhile, JP-A-1989-314151 discloses a method for forming a tire's annular member having a shape extended in the radial direction such as a sidewall, in which an extruded rubber body is processed by calendar rollers and then is supplied to a rotating annular support shaped as a truncated cone. Thus formed rubber sheets or strips are wound around the annular support to form a tire's annular member. This method requires the calendar roller; and forming of the tire's annular member is not made in a wound state. Thus, shape or dimensions of the tire's annular member is unstable or may be erratic and satisfactory precision is not achieved.

In view of the above, it is aimed to form a tire's annular member expanded predominantly in a radial direction such as a bead filler, a sidewall, or the like, by a relatively simple equipment and at high precision; and thereby to reduce irregularities in weight and uniformity of tire product, thus achieving high quality of the tire product.

In view of the above, it is aimed to provide a method and device for manufacturing a tire's annular member having a stretch mainly in radial direction such as a bead filler and a sidewall; by use of simple devices and simple way of pressing and with high precision and easiness, for achieving tire products of high quality with suppressed fluctuation in mass and/or uniformity.

SUMMARY OF THE INVENTION

Invention-wise method for manufacturing a tire's annular member by use of a first mold that includes a profile mold having an annular recess that corresponds to a shape of the tire's annular member and of a second mold capable of facing and coming into contact with the first mold to close an opening of the profile mold, comprising: continuously extruding and supplying a to-be vulcanized rubber body into a recess of the profile mold using an extruder, and rotating the profile mold simultaneously with the extruding, so as to make the rubber body annularly continuous in the recess; and, in such state, making the first mold and the second mold face each other and then contact with each other so as to press the rubber body by the profile mold and the second mold, and thus shaping the rubber body into a predetermined shape defined by the profile mold. Due to such construction, a uniform tire's annular member having no joint portion is formed precisely in a predetermined shape.

Preferably in the above manufacturing method, said rotating being made in correspondence with a rate of said extruding; and volume of the rubber body being controlled as to correspond to that of the recess. Due to such a construction, it is able to prevent an extra rubber material from flashing or spewing out, and thereby to form an annular member having a well-balanced mass or volume.

In an embodiment, the tire's annular member is a bead filler having a shape of ringed disc and having a substantially triangular cross section tapered toward radially outside, and a recess of the profile mold becomes shallower with approaching toward radially outside in correspondence with the annular member; said method further comprises placing an annular bead reinforcing member on an inner periphery of the recess on the profile mold, and thereafter said extruding and supplying being made along the outer periphery of the bead-reinforcing member. Due to such a construction, the annular member having the bead-reinforcing member bonded with rubber body and having a predetermined shape is obtained.

Invention-wise device for forming a tire's annular member comprises: a first mold that includes a profile mold having an annular recess that corresponds to a shape of the annular member; a second mold which is capable of facing and coming into contact with the first mold to close an opening on the profile mold; and an extruder which continuously extrudes and supplies a to-be vulcanized rubber body in an elongated shape into a recess on the profile mold of the first mold during a time the first mold and the second mold are not brought into contact with each other; and the profile mold being rotatable about a central axis thereof and being rotated corresponding to an extruding and supplying by the extruder; and resultantly, the to-be vulcanized rubber body being placed as annularly continuous in the annular recess of the profile mold. Due to such construction, the annular members in above manner are reliably formed.

It is particularly preferable when the profile mold is rotated corresponding to a rate the extruder extrudes the rubber body; and rotation of the profile mold is controlled such that volume of the rubber body is in conformity with volume of the recess. Due to such construction, it is possible to form the annular member while preventing the projection of the extra rubber material from the annular member.

The profile mold may be replaceably mounted on a base portion of the first mold. In such a case, it is easy to cope with change or switching of the dimensions of the annular members, by replacing the profile mold easily.

In a preferred embodiment, the extruder has a die mounted on a distal end thereof being movable between a first position at which the die faces a portion of the recess on the profile mold of the first mold and a second position separated away as deviated laterally to the first mold from the first position; and the extruder is moved to the first position as to approache the profile mold at a time the second mold being separated from the first mold.

Preferably, the second mold is movable between a first position at which the second mold faces the first mold and a second position separated away as displaced in parallel with main faces of the first mold; and at least one of the first and the second molds is displaceable as to approach each other when the first and second molds face each other. It is also preferable when the forming device further comprises a mechanism for pressing the second mold onto the first mold, wherein said mechanism is disposed at rear or outside of the second mold.

As in above, according to the forming method and the forming device of the tire's annular member of the present invention, it is able to easily and precisely form the tire's annular member formed of a rubber material and having a stretch mainly in the radial direction such as the bead filler and the side wall; by use of the relatively simple device having the pair of molds and the extruder, whereby fluctuation in mass and/or uniformity of tire product is suppressed thus enabling the production of high-quality tires.

BRIEF DESCRIPTION OF THE DRAWINGS

FIGS. 10A and 10B are a perspective view and an enlarged cross-sectional view respectively, for explaining the forming process showing a stage the second mold is pressed onto the first mold as inner faces of the molds are brought together;

FIG. 14 is a cross-sectional perspective view showing a bead filler which is a tire's annular member that is a target product of the invention-wise method.

DETAILED DESCRIPTION OF THE INVENTION

An embodiment of the invention-wise forming method and forming device is explained by use of the drawings.

A tire's annular member 1, which is a product of the invention-wise forming method, is a bead filler for example to be used in a tire bead portion and has a substantially triangular cross section. As shown in FIG. 14, the tire's annular member 1 is a flat ring tapered toward radially outward direction and has a predetermined radial dimension or height "h". The tire's annular member 1 is bonded onto outer circumferential face of the bead's reinforcing member 2 which is formed of wires or the like, as to form a bead assembly.

Figure 1:
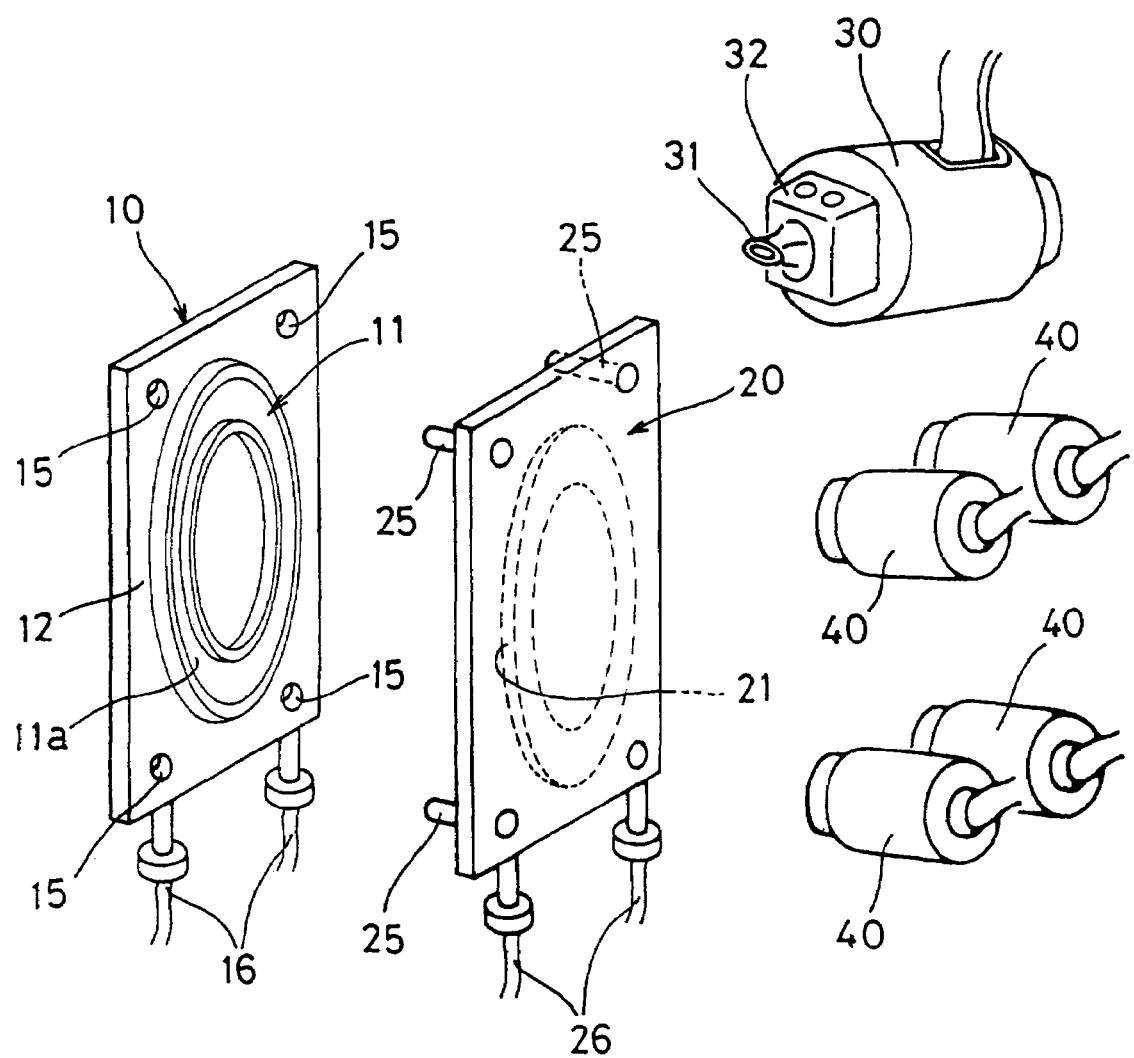
FIG. 1 is an exploded perspective view schematically showing a forming device of an embodiment of the present invention.
Figure 2:
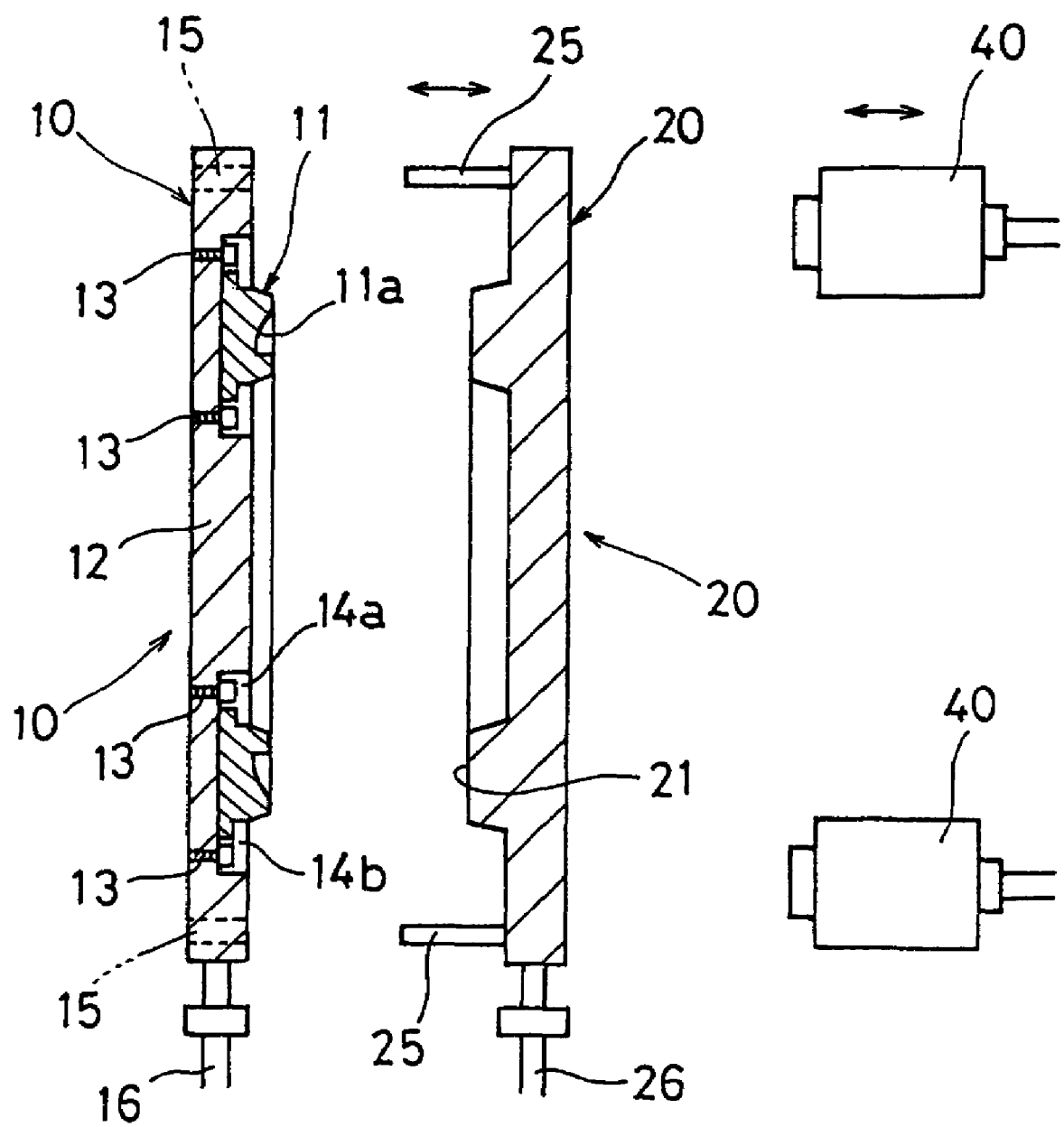
FIG. 2 is a cross-sectional view schematically showing a part of the forming device in FIG. 1.
Figure 3:
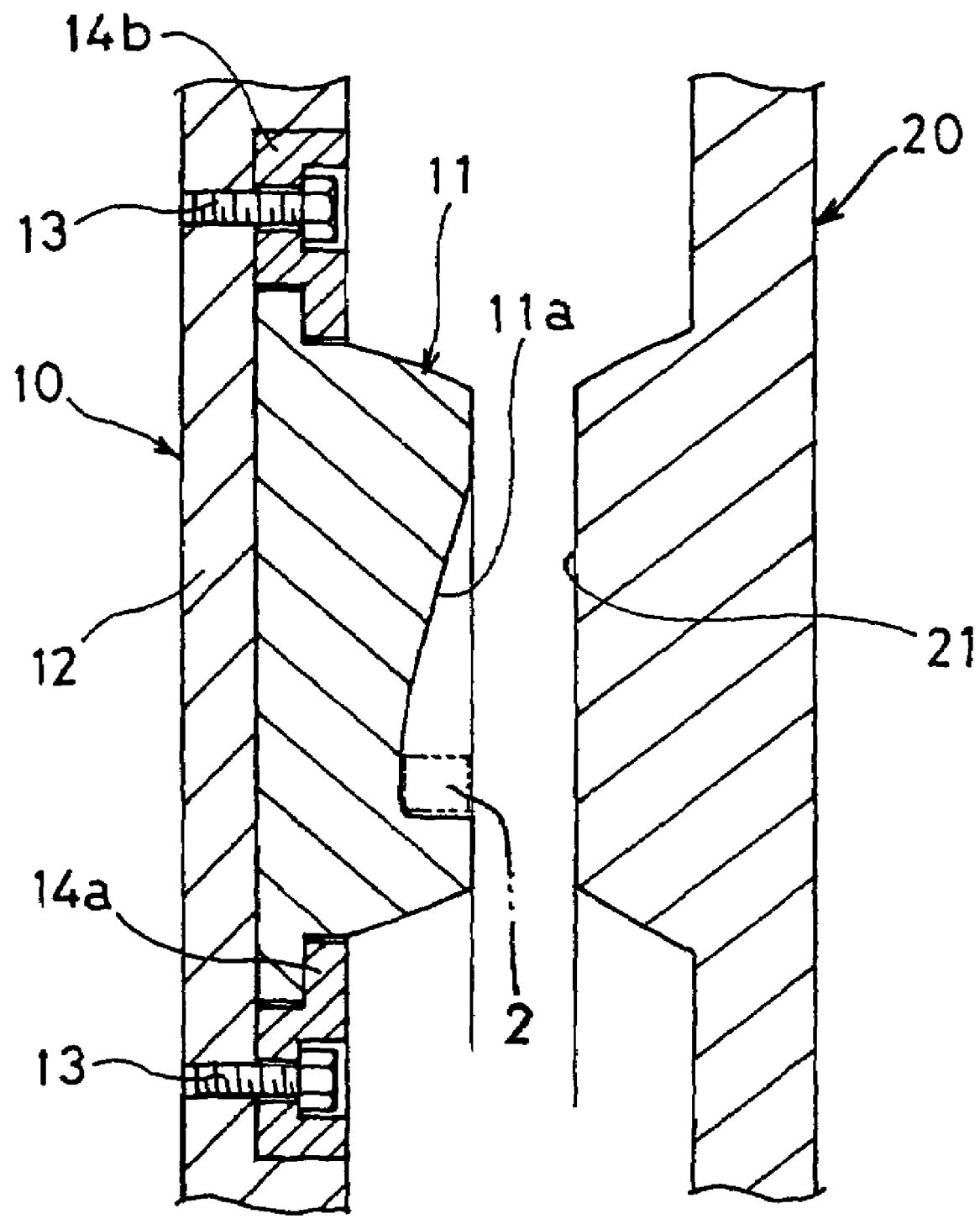
FIG. 3 is an enlarged cross-sectional view showing a portion of the forming device.

Firstly, outline of a forming device of the embodiment will be explained. FIG. 1 is an exploded perspective view schematically showing essential part of the forming device; FIG. 2 is a cross-sectional view of the same forming device; FIG. 3 is an enlarged cross-sectional view on part of the FIG. 2; and FIGS. 4-11 are explanatory views for showing a sequence of process steps.

In the drawings, numeral 10 designates a first mold provided with an annular profile mold 11 thereon, which is a concave ring engraved with a shape of the tire's annular member 1 that is formed from a to-be-vulcanized elongated rubber body "a", as to form a molding face 11a; for example the annular profile mold 11 is engraved with a shape of the bead filler with a substantially triangular cross section. The annular profile mold 11 is mounted on a base 12 of the first mold 10 by following manner. At along inner and outer edges of the annular profile mold 11, latches 14a, 14b are fixed to a front face of the base 12 by screw-wise fastening means 13 such as bolts; and the inner and outer edges of the annular profile mold 11 are latch-wise fastened by the latches 14a, 14b. The annular profile mold 11 is detachable and re-attachable by unfastening the latches 14a, 14b. In this way, the annular profile mold 11 is replaceable with another one having different shape and size in the annular recess that corresponds to another one of the tire's annular members.

The annular profile mold 11 is rotatably mounted about an axis thereof. Rotating of the annular profile mold 11 may be accomplished in various manners. For example, the rotation may be transmitted to the annular profile mold 11 from the back side of the first mold 10; and the annular profile mold 11 is rotated with respect to the base 12 of the first mold 10 which supports and retains the annular profile mold 11. Alternatively, as in the case of an embodiment shown in FIG. 12 and FIG. 13 described later, the first mold 10 as a whole may be rotated. In any case, the annular profile mold 11 is controlled to rotate approximately by one turn, at every forming cycle, in response to extrusion of the elongated rubber body from the extruder.

Numeral 20 in the drawing designates a second mold, which makes a mold form with the first mold 10. The second mold 20 is brought to the second mold 20 into contact with the first mold 10 so as inner faces of the molds are brought together and an opening of the annular profile mold 11 is closed. In the embodiment shown in FIG. 1 to FIG. 11, on inner face of the second mold 20, a molding face 21 formed of a projection is provided in an annular shape almost in conformity with the annular profile mold 11. In the drawings, numeral 25 designates positioning pins that are formed as protruded on four corners of the second mold 20. These positioning pins 25 are inserted into positioning guide holes 15 that are formed in four corners of the first mold 10 when the second mold 20 is brought into contact with the first mold 10. By such positioning, no misalignment is arisen when the second mold 20 is brought into contact with the first mold 10.

The second mold 20 is arranged to be movable between; a position at which the second mold 20 faces the first mold 10 with a distance; and a standby position at which the second mold 20 is spaced apart as laterally deviated in either of rightward and leftward, from the position at which both molds 10, 20 face each other. As means for moving the second mold 20, various constitutions are considered including, for example, the constitution which uses a base which supports the second mold 20 thereon and is moved using a linear guide, a ball screw and drive means, in the same manner as a case shown in FIG. 12 and FIG. 13 described later.

Further, at least one of the first mold 10 and the second mold 20, the second mold 20 for example, is arranged to be displaceable in an abut-wise contacting direction or in front-to-rear direction, in a position where the first and the second molds 10, 20 face each other. As means to displace the second mold 20, in the above-mentioned facing position, the second mold 20 is displaceable in the contacting direction with respect to the first mold 10 by use of a linear guide and a drive mechanism for moving or the like (not shown in the drawing). Besides the above constitution, as in the case of the example shown in FIG. 12 and FIG. 13, the first mold 10 may be displaced in the contacting direction with respect to the second mold 20.

Further, in the embodiment shown in FIG. 1 to FIG. 11, as a mechanism for pressing the second mold 20 to the first mold 10; hydraulic cylinders 40 which respectively press the second mold 20 onto the first mold 10 at a given pressure are mounted on rear face of the second mold 20, at four corners of an area in which the second mold 20 face-to-face-wise superimposes the first mold 10. In normal positions, the hydraulic cylinders 40 are waiting for actuating at rearward of the four corners of the second mold 20, as supported by some supporting mechanism. At a time of press actuating, the hydraulic cylinders 40 move and abut on the rear face of the second mold 20. The mechanism for such moving is not illustrated in the drawings. In the mechanism for press actuating, the hydraulic cylinders using a fluid other than oil or other drive sources may be used.

Meanwhile, the first mold 10 and the second mold 20 are maintained at a predetermined temperature by respectively supplying and circulating a heating medium such as steam in these molds. In the drawing, numerals 16 and 26 respectively designate circulation passage tubes for the heating medium.

Numeral 30 in the drawings designates a relatively small-sized extruder that continuously extrudes and supplies the to-be-vulcanized elongated rubber body "a", in a face-to-face position, to the inside of the annular recess of the profile mold 11; at a time the second mold 20 is not brought into contact with the first mold 10. The extruder 30 is capable of extruding the rubber body at constant rate, typically by use of a gear pump 32 provided in vicinity of a die 31 on a distal end of the extruder 30.

The extruder 30 is movable between; a position at which the die 31 faces the annular recess of the profile mold 11 on the first mold 10; and a standby position which is spaced apart as laterally deviated in either of rightward and leftward, from the first mold 10. The extruder 30 moves to a position at which both molds 10, 20 face each other, during a time the second mold 20 is separated from the first mold 10, particularly in a laterally deviated position. Further, in such inter-mold facing position, the extruder 30 is displaced in a direction to approach a surface of the annular profile mold 11.

Accordingly, although not shown in the drawing, in the same manner as the second mold 20, the extruder 30 is movable in a lateral direction and in an inter-mold approaching direction by a mechanical mechanism such as a combination of; a linear guide in the left-and-right direction, a linear guide in the front-to-rear direction and drive mechanism which moves the extruder 30 in the left-and-right and front-to-rear directions. Particularly, the extruder 30 and the second mold 20 are arranged such that during a time one of them is at the standby position with respect to the first mold 10, the other moves to the position facing the first mold 10. Accordingly, it is preferable that; the extruder 30 and the second mold 20 are synchronously moved and are laterally deviated from the first mold 10 in opposite directions to their standby positions.

The die 31 of the extruder 30 may be shaped in any configuration, so far as the die 31 has a width smaller than a width of the annular recess of the annular profile mold 11 so that the recess is charged with the to-be-vulcanized elongated rubber body "a". However, it is preferable that a cross-sectional area of the to-be-vulcanized elongated rubber body "a" is set to be substantially equal to or slightly larger than that of the recess.

The method for forming the tire's annular member 1 using the above-mentioned forming device is explained in conjunction with FIG. 4 to FIG. 11. Target values of temperature control of the first mold 10 and the second mold 20 are set to around 110° C.

Figure 4:
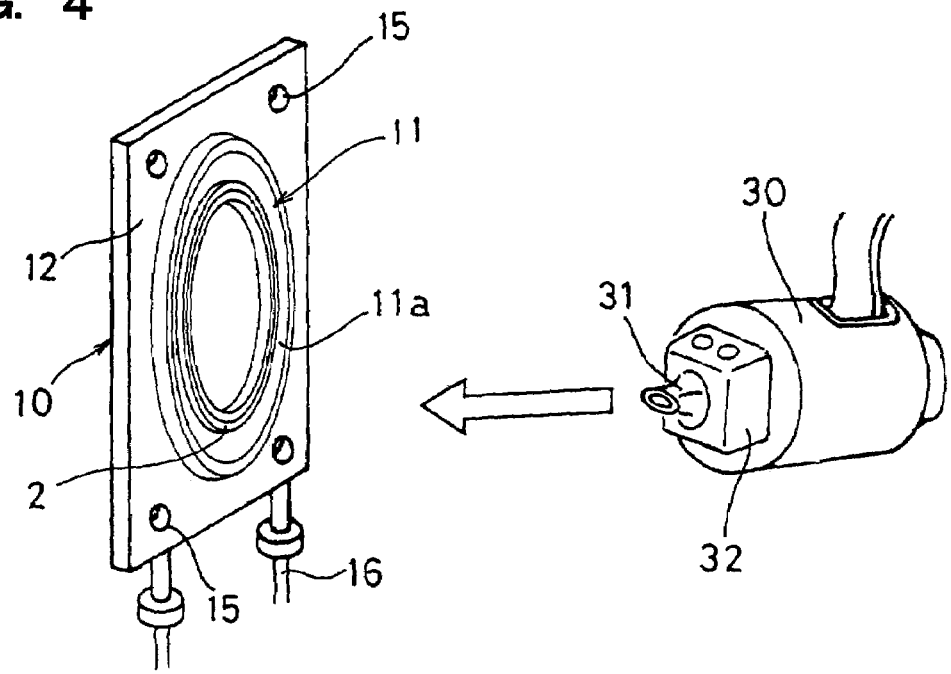
FIG. 4 is a perspective view for explaining a forming process showing a stage an extruder is approaching toward a first mold.
Figure 9A:
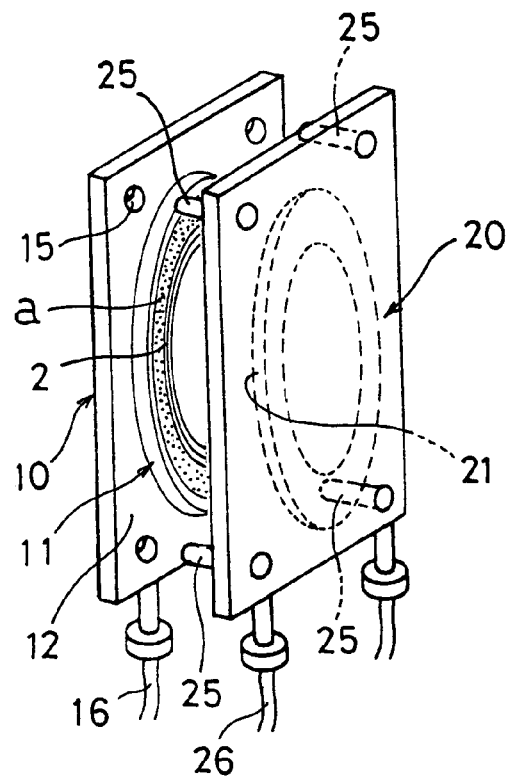
FIGS. 9A and 9B are a perspective view and an enlarged cross-sectional view respectively, for explaining the forming process showing a stage a second mold is brought to be opposed to the first mold.
Figure 9B:
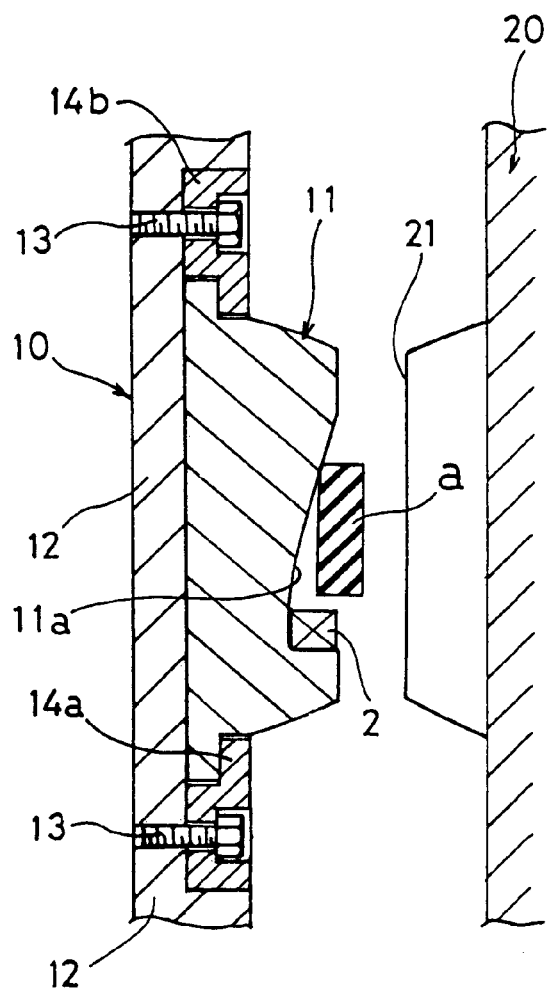

When the tire's annular member 1 to be formed is a member such as a bead filler which is formed by adhering the rubber body "a" to the outer periphery of the annular bead reinforcing member 2; first of all, the bead reinforcing member 2 is set on the inner peripheral side of the recess of the annular profile mold 11 of the first mold 10 as shown in FIG. 4 or FIG. 9B. At this time, the second mold 20 is arranged at the standby position laterally deviated from the first mold 10; and the extruder 30 is positioned as to face the first mold 10.

Figure 5:
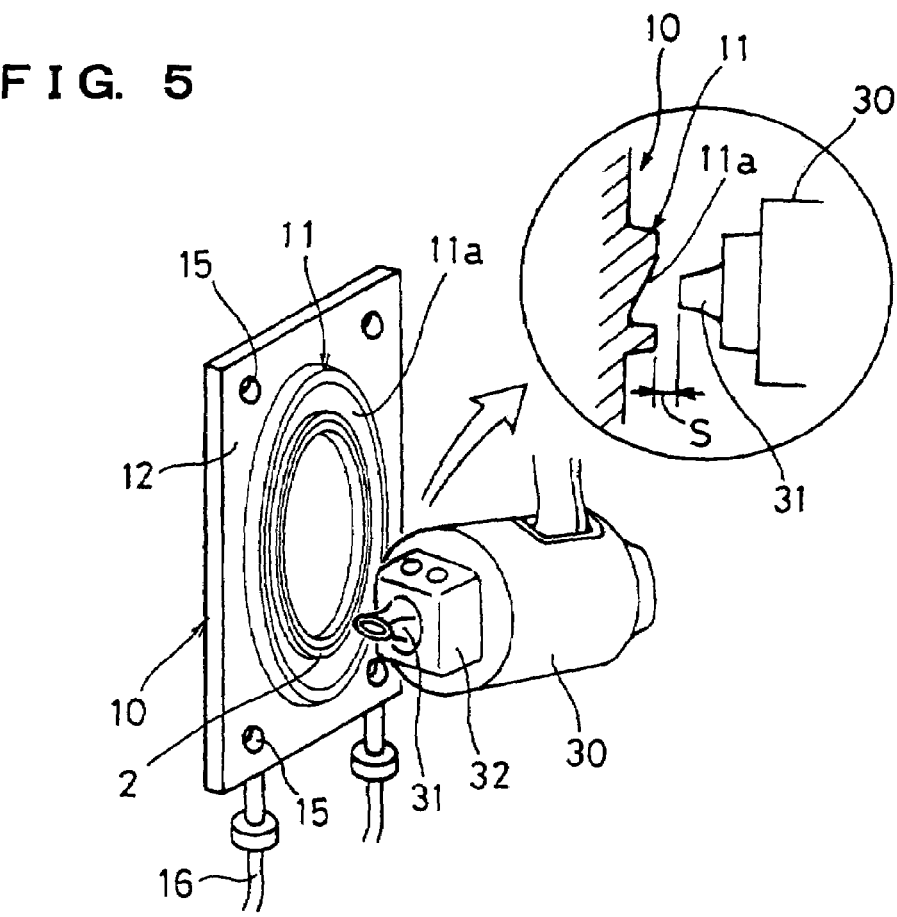
FIG. 5 is a perspective view for explaining the forming process showing a stage an extruder has approached to a first mold.

In such a state, as indicated by an outlined arrow in FIG. 4, the extruder 30 is displaced such that the die 31 on distal end thereof approaches a portion of the annular profile mold 11; and, thereafter, is stopped with a slight distance "s", which allows the extrusion of the rubber body "a", of about a 3 mm for example, between the die 31 and the surface of the annular profile mold 11 as shown in FIG. 5.

Figure 6:
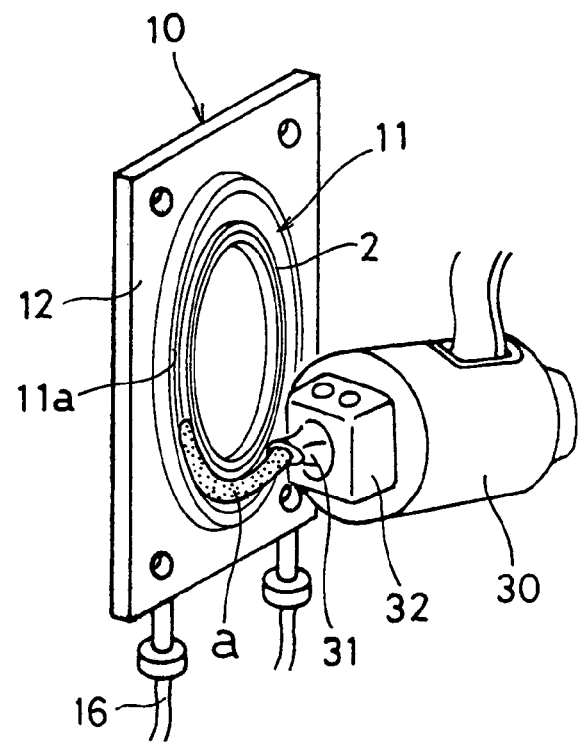
FIG. 6 is a perspective view for explaining the forming process showing a stage a rubber braid is being extruded from the extruder.
Figure 7:
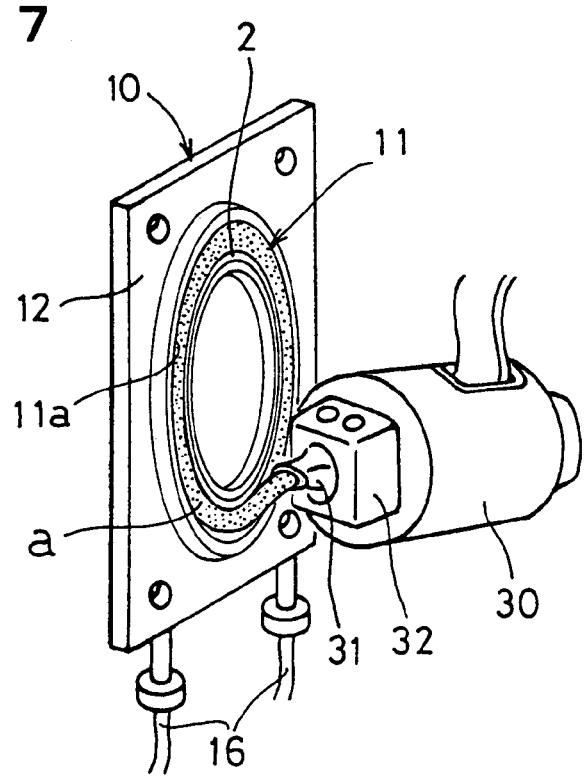
FIG. 7 is a perspective view for explaining the forming process showing a stage when an annular profile mold attached on the first mold have rotated by one circuit, in course of extruding the rubber braid from the extruder.

Thereafter, as shown in FIG. 6 and FIG. 7, the extruder 30 already filled with the rubber material up to the die 31 starts operation when a not-illustrated switch is turned on, and then extrude the to-be-vulcanized elongated rubber body "a". Simultaneously with the operation of the extruder 30, the annular profile mold 11 which is mounted on the first mold 10 or the first mold 10 is rotated by one turn; so as to fill the annular recess of the annular profile mold 11 with the to-be-vulcanized elongated rubber body "a", over the whole circumference; thus connecting the rubber body "a" in an annular shape.

In detail, arrangement is made such that; the annular profile mold 11 or the first mold 10 starts its rotation at a time the switch of the extruder 30 is turned on, and stops the rotation thereof at a time point that the annular profile mold 11 or the first mold 10 has been rotated by one turn or 360°, which corresponds to the extruding and supplying of the rubber body "a". Further, the rotation of the annular profile mold 11 or the first mold 10 is controlled so as to be rotated at a rate corresponding to an extruding rate of the rubber body "a" by the extruder 30; so that volume of the rubber body "a" continuously extruded from the extruder 30 is in conformity with volume of the recess of the annular profile mold 11.

Controlling by a computer or the like is made such that; simultaneously with the stop of the rotation of the annular profile mold 11 or the first mold 10 after the rotation of one turn or 360°, the operation switch of the extruder 30 is turned off and the extruder 30 stops extrusion of the to-be-vulcanized elongated rubber body "a".

Hence, after one rotation of the annular profile mold 11, the to-be-vulcanized elongated rubber body "a" having a volume in conformity with the recess fills the recess as to be annularly continuous.

Figure 8:
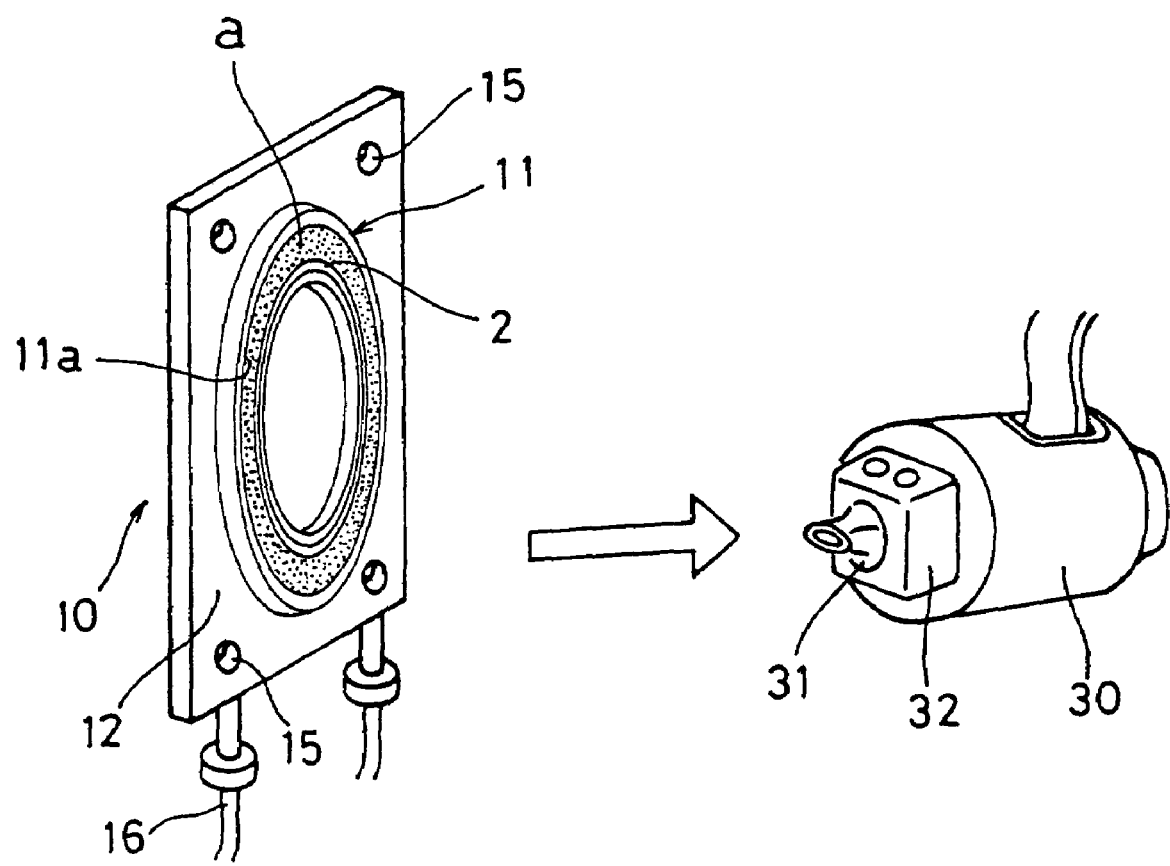
FIG. 8 is a perspective view for explaining the forming process showing a stage the extruder is receded from the first mold.

Further, simultaneously with the stop of the extrusion, the extruder 30 is moved away from the position close to the first mold 10 and is returned to a position facing the first mold 10 as shown in FIG. 8 and, thereafter, is moved to the standby position at right-hand or left-hand side.

Simultaneously with such moving of the extruder 30, the second mold 20 having waited for operation is moved from the standby position to a position facing the first mold 10. Then, at the position facing the first mold 10 shown in FIG. 9A, the second mold 20 is sliding-wise displaced mechanically in a direction approaching the second mold 20. Resultantly, the positioning pins 25 formed on four corner portions of the second mold 20 are fitted into the positioning guide holes 15 formed on four corner portions of the first mold 10; thus positioning between the first and second molds 10, 20 are made when those approaches to each other. In such fitted state, the second mold 20 is disconnected from the power source or drive mechanism that has made the slide-wise displacement of the second mold 20; and thereby the second mold 20 being supported in a state freely movable in such approaching direction.

In this state, the hydraulic cylinders 40 which stand by behind four corner portions as mechanism for pressing are moved to the position at which the hydraulic cylinders 40 are brought into contact with the back or outer face of the second mold 20 as shown in FIG. 10. Then, the hydraulic cylinders 40 start the pressing of the second mold 20 with a hydraulic pressure so as to press the rubber body "a" which is charged in the recess of the annular profile mold 11 as sandwiched between the molding face 11a of the annular profile mold 11 and the molding face 21 of the second mold 20. The pressing conditions may be arbitrarily selected depending on kind or species, hardness, volume and the like of the rubber body "a" and the like. For example, the pressing conditions are set such that the pressing force of the hydraulic cylinder 40 is 10 ton (8 kgf/cm$^2$), the cylinder stroke is 30 mm, the bore or inner diameter of the cylinder is 40 mm and the pressing time is 45 seconds.

As a result of such pressing, the rubber body "a" is pressed and deformed in conformity with the shape of the recess of the annular profile mold 11, particularly with the shape of a cavity defined by the molding face 11a of the first mold 10 and the molding face 21 of the second mold 20. At the same time, a joint portion joining ends of the to-be-vulcanized elongated rubber body "a" becomes an integrated or merged portion; and the rubber body "a" adheres to the bead reinforcing member 2 which has been set on the inner peripheral side. The volume of the rubber body is controlled by controlling of rotating rate of the annular profile mold 11 and the extruding rate of the rubber body "a" as described previously; and thus, substantially no flash or spew out of the cavity is formed after the forming, and the rubber body "a" is precisely formed into a predetermined shape defined by the annular profile mold 11.

Figure 11:
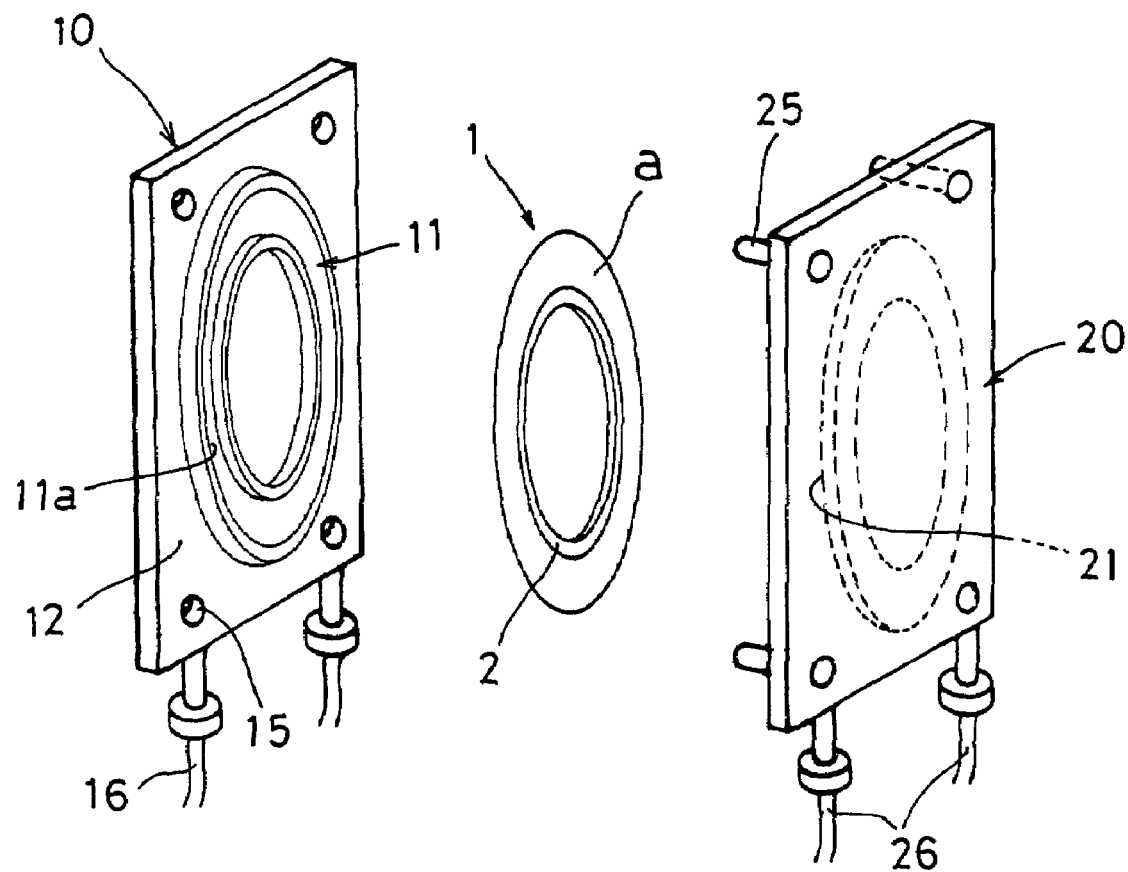
FIG. 11 is a perspective view for explaining the forming process showing a stage the second mold is receded from the first mold.

After the pressing, the hydraulic cylinders 40 are moved to their standby position at rearward so as to release the pressing and the second mold 20 is separated from the first mold 10 as shown in FIG. 11 and, then, is moved to its standby position. In this way, the tire's annular member 1 thus formed become retrievable from the annular profile mold 11 on the first mold 10.

By repeating of steps substantially equal to the above, it is able to repeatedly and continuously form the tire's annular member 1 shown in FIG. 14, which is constituted as the bead filler bonded to the bead-reinforcing member 2 and has no apparent joint. The operation of each of forming steps is automatically controlled by the computer.

According to the forming method of the present invention, it is able to easily and precisely form the tire's annular members 1 stretched mainly in the radial direction, such as the bead filler and the sidewall, by use of relatively simple device having the pair of molds and the extruder. By use of thus obtained tire's annular member 1, fluctuation in mass and/or uniformity of tire product is suppressed; thus enabling production of the tire product in high quality.

In the above embodiment, the explanation is made to a case the bead filler is formed as adhered to the bead-reinforcing member 2 is formed. Nevertheless, the tire's annular members such as the bead filler and the sidewall may be formed separately from the bead-reinforcing member; and the tire's annular members solely formed of the rubber material may be formed in the above manner except for charging of the bead-reinforcing member.

Figure 12:
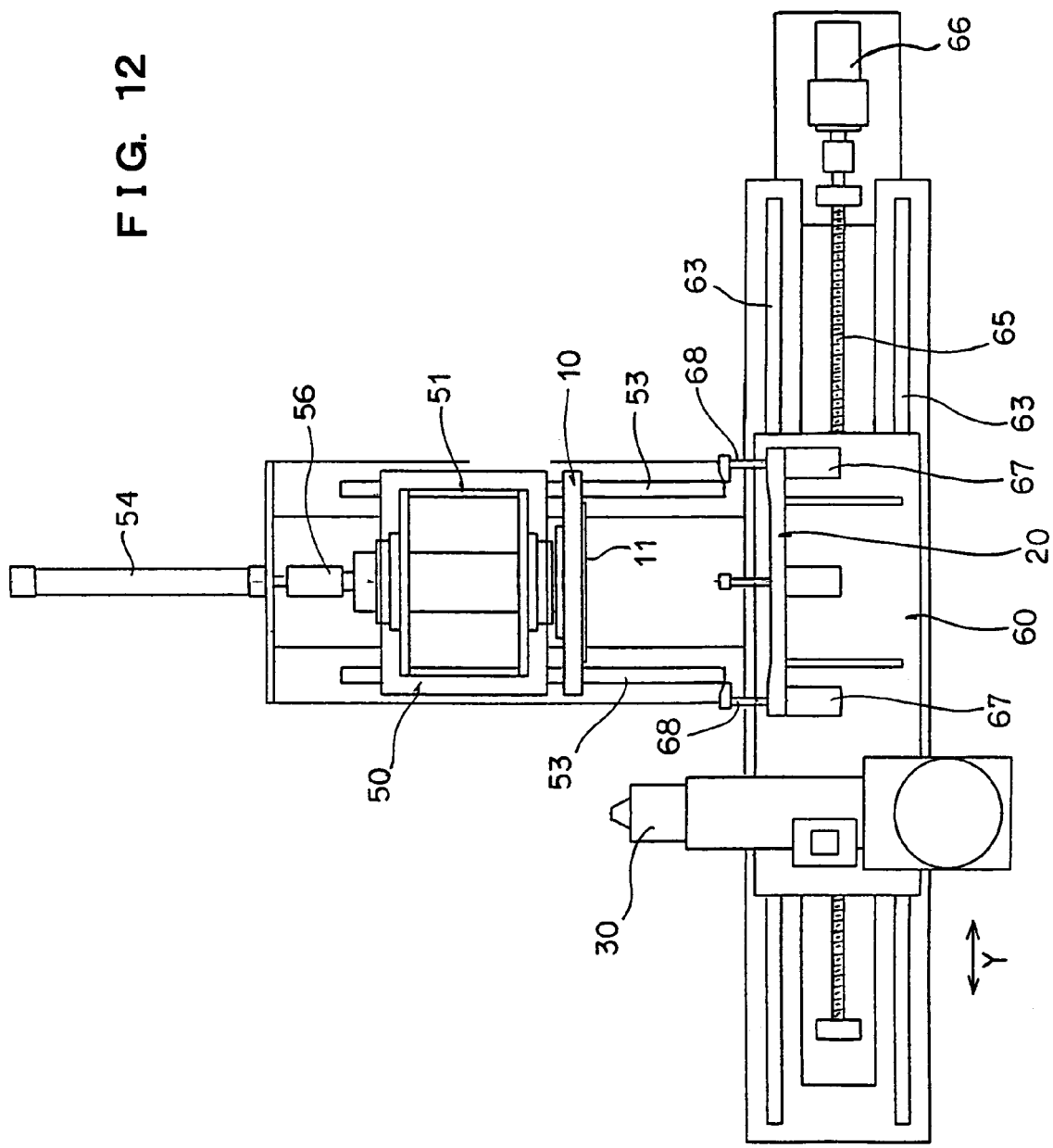
FIG. 12 is a plan view schematically showing a forming device of another embodiment.
Figure 13:
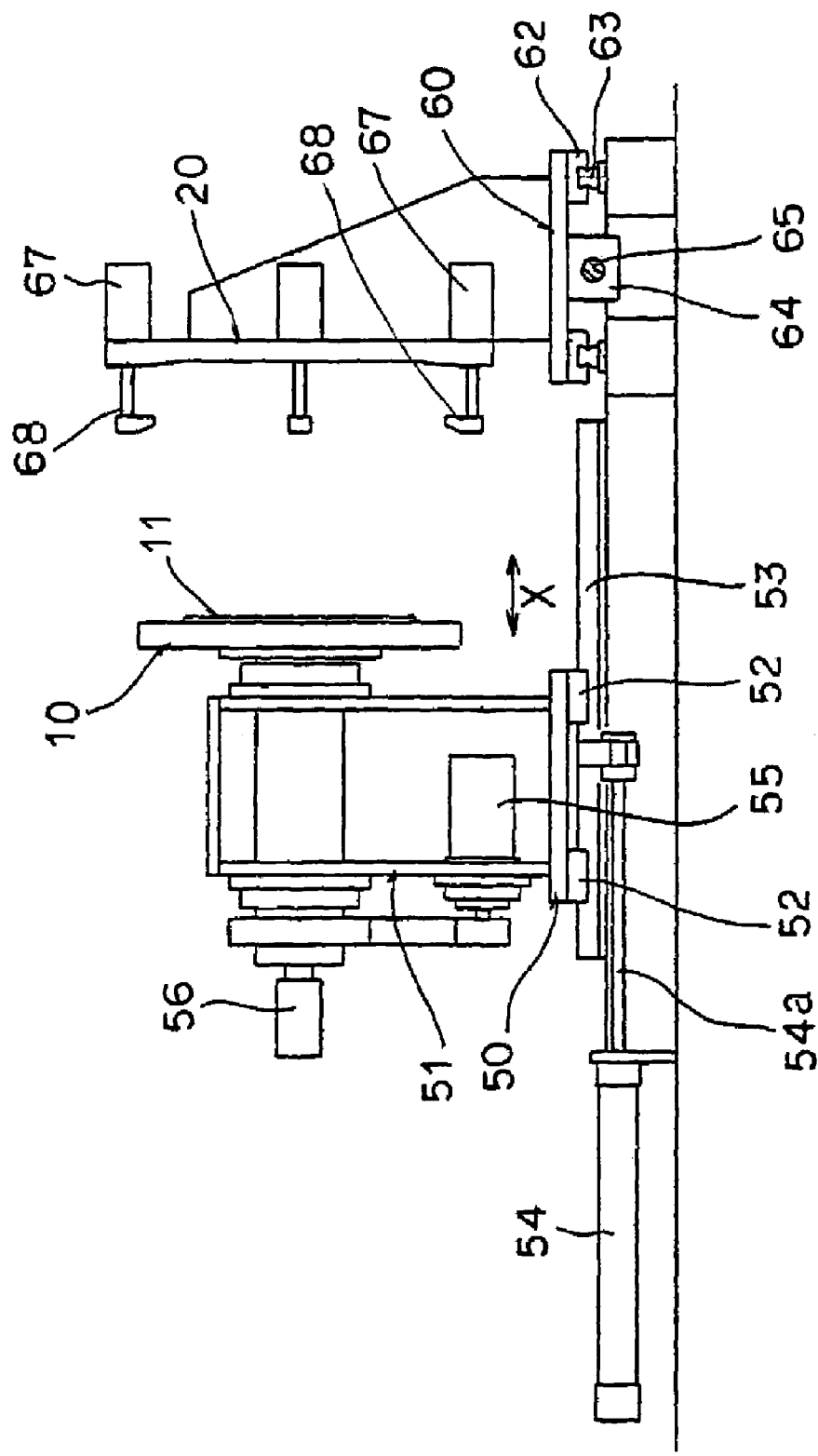
FIG. 13 is a side cross-sectional view schematically showing the forming device of another embodiment shown in FIG. 12.
Figure 15:
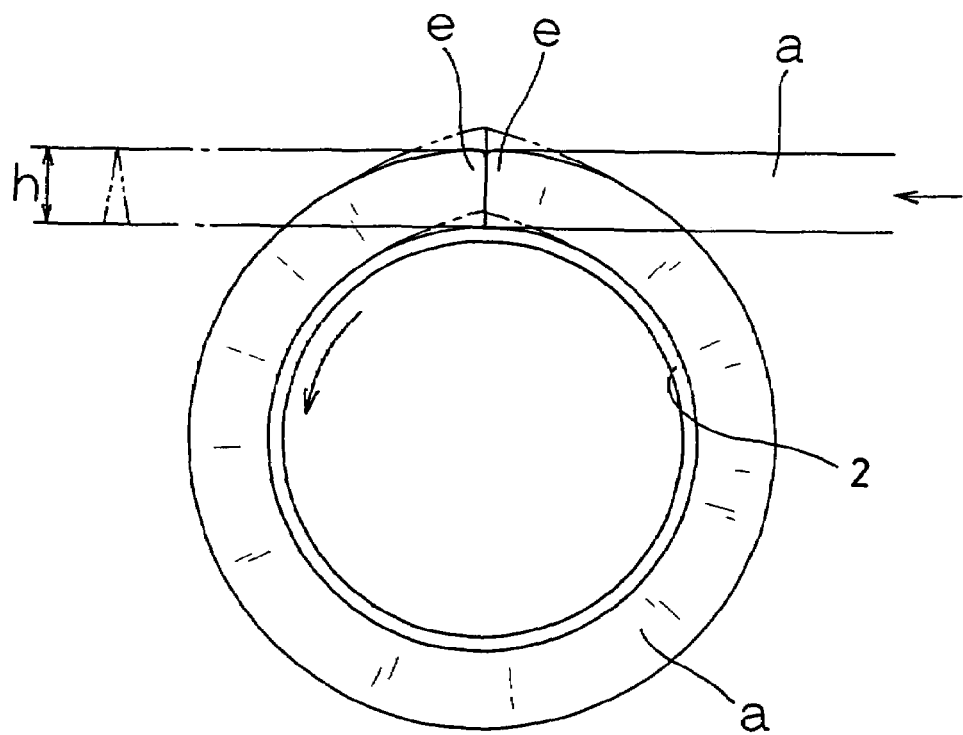
FIG. 15 is an explanatory view showing a stage a tire's annular member is formed by a conventional method.

FIG. 12 and FIG. 13 show one example of a mechanism for moving the first mold 10 having the annular profile mold 11, the second mold 20, the extruder 30 and the like, as well as a mechanism for rotating the annular profile mold 11 and the like. These mechanisms for moving and the like are also applicable to the embodiment shown in FIG. 1 to FIG. 11.

In this embodiment, the first mold 10 provided with the annular profile mold 11 is rotatably supported on a frame 51 mounted on a base 50. The base 50 is movable in the front-to-rear direction (in the arrow X direction in FIG. 13) in a manner that guide portions 52 formed on a lower surface of the base 50 are engaged with rails 53 of a linear guide. The lower surface of the base 50 is connected with an output shaft 54a of a cylinder device 54 such as an electrically operated cylinder, for driving. By the cylinder device 54, the base 50 is moved in the front-to-rear direction, which is a direction the first mold 10 is moved toward and away from the second mold 20 that faces the first mold 10.

The first mold 10 is connected with a drive servomotor 53 by way of rotation transmission mechanism including a rotary joint 56 and the like and the first mold 10 is rotated by the operation of the serve motor 55.

The second mold 20 which closes the opening of the annular profile mold 11 by facing-wise contacting with the first mold 10 is mounted on a base 60, as shown in the drawing. The second mold 20 together with the base 60 moves between the position at which the second mold 20 faces the first mold 10 and the standby position separated as deviated in right-hand or left-hand side.

In detail, the base 60 is supported as movable in the left-and-right direction (in the arrow Y direction in FIG. 12) in a manner that guide portions 62 formed on a lower surface of the base 60 are engaged with rails 63 of a linear guide; and a block 64 which is attached to the lower surface of the base 60 is engaged with a ball screw 65 which extends in a direction the linear guide runs. By rotating the ball screw 65 with the actuation of the servomotor 66 that is connected to the ball screw 65, the base 60 is moved, and thereby, the second mold 20 mounted on the base 60 is moved in right-left-wise direction. As a mechanism for pressing the second mold 20 onto the first mold 10, clamps 68 that clamp and pull the first mold 10 toward the second mold 20, as well as cylinders 67 for actuating the clamps 68 to perform a clamping action are mounted on four corners of the second mold 20.

The extruder 30 is mounted on the base 60. When the base 60 is moved, the second mold 20 is moved from the position at which the second mold 20 faces the first mold 10 to the standby position, and, in course of this, the extruder 30 is moved to the position at which the extruder 30 faces the first mold 10. At a time the extruder 30 moves to the standby position (position shown in FIG. 12), the second mold 20 is moved to the position at which the second mold 20 faces the first mold 10.

Shape, construction, and manner of controlling of movement and rotation in respect of the annular profile mold 11 in the forming operation in this embodiment are equal to those of preceding embodiment; and the tire's annular members are formed in same manner as the preceding embodiment.

By way of illustrated examples, the explanation is made to the forming devices in which the first mold 10 and the second mold 20 are arranged to face each other in the front-to-rear direction. However, other arrangements are adoptable. For example, forming in same manner as above may be made by arranging the first mold 10 as a lower mold, the second mold 20 as an upper mold, and the extruder 30 and the hydraulic cylinders 40 above and below the first mold 10.

The present invention is preferably applicable informing of the tire's annular member having a stretch mainly in the radial direction, such as the bead filler and the sidewall.

What is claimed is:

1. A method for manufacturing a tire's annular member by use of a first mold that includes a profile mold having a molding face defining an annular recess that corresponds to a shape of the tire's annular member and of a second mold capable of facing and coming into contact with the first mold to close an opening of the profile mold, and further using an extruder for delivering vulcanizable rubber mass to the annular recess of the profile mold, the steps of the method comprising:

supporting the first mold (10) on a base (50) movable toward and away from the second mold (20), supporting the second mold (20) and extruder (30) on a second base (60) movable in a direction perpendicular to the direction of movement of the first base (50)

by movement of the second base (60), simultaneously moving the second mold (20) from the position at which the second mold (20) faces the first mold (10) to a standby position, and moving the extruder (30) from a standby position to the position at which the extruder (30) faces the first mold (10), in a state where the extruder (30) faces the first mold (10), continuously extruding and supplying a to-be vulcanized rubber body into a recess of the profile mold using an extruder, and rotating the profile mold simultaneously with the extruding, so as to make the rubber body annularly continuous in the recess; and, subsequently, moving the second base (60), simultaneously moving the extruder (30) from the position where the extruder (30) faces the first mold (20) to the standby position, and moving the second mold (20) from the standby position to the position at which the second mold (20) faces the first mold (10), and thereafter, moving the first base (50), thereby moving the first mold (10) toward the second mold (20), whereby making the first mold and the second mold face each other and then contact with each other so as to press the rubber body by the profile mold and the second mold, and thus shaping the rubber body into a predetermined shape defined by the profile mold (11), and thereafter separating the second mold (20) from the first mold (10) and retrieving a molded annular member (1).

2. A method for manufacturing a tire's annular member according to claim 1, said rotating being made in correspondence with a rate of said extruding; and volume of the rubber body being controlled as to correspond to that of the recess.

3. A method for manufacturing a tire's annular member according to claim 1 or 2, the tire's annular member being a bead filler having a shape of ringed disc and having a substantially triangular cross section tapered toward radially outside, and a recess of the profile mold becoming shallower with approaching toward radially outside in correspondence with the annular member; said method further comprising:

placing an annular bead reinforcing member on an inner periphery of the recess on the profile mold, and thereafter said extruding and supplying being made along the outer periphery of the bead-reinforcing member.

4. A forming device of a tire's annular member, comprising:

a first mold that includes a profile mold having a molding face shaped as an annular recess that corresponds to a shape of the annular member;

a second mold which is capable of facing and coming into contact with the first mold to close an opening on the profile mold; and an extruder which continuously extrudes and supplies a to-be vulcanized rubber body in an elongated shape into a recess on the profile mold of the first mold during a time the first mold and the second mold are not brought into contact with each other; and the profile mold being rotatable about a central axis thereof and being rotated corresponding to an extruding and supplying by the extruder; and resultantly, the to-be vulcanized rubber body being placed as annularly continuous in the annular recess of the profile mold the first mold (10) being supported on a base (50) movable toward and away from the second mold (20), whereby the first mold (10) moves to approach the second mold (20) via movement of the base (50) when the first and second molds (10) (20) face each other so that they contact each other, and the second mold (20) and the extruder (30) being mounted on a second base (60) movable in a direction perpendicular to the direction of movement of the first base (50), wherein when the second base (60) is moved, the second mold (20) is moved from a position at which the second mold (20) faces the first mold (10) to a standby position, and, simultaneously, the extruder (30) is moved from a standby to a position in which the extruder (30) faces the first mold (10), and at a time the extruder (30) moves to the standby position, the second mold (20) is moved to the position at which the second mold (20) faces the first mold (10).

5. A forming device of a tire's annular member according to claim 4, wherein the profile mold is replaceably mounted on a base portion of the first mold.

6. A forming device of a tire's annular member according to claim 4, further comprising a mechanism for pressing the second mold onto the first mold, said mechanism being disposed at rear or outside of the second mold.

7. A method of making an annular member of a tire comprising the steps of:

providing a first mold [10] having a profile mold [11] having a open circular annular recess corresponding to the shape of the annular member and rotatable within the first mold, the first mold supported on a first translatable base [50] translatable along a first direction;

providing a second mold [20] having a surface for contacting and closing a surface of the annular recess and an extruder having a die [30], both second mold and extruder supported on a second translatable base [60] translatable along a second direction orthogonal to the first direction, the second mold and the extruder supported on the second translatable base [60] such that, in a first second-base position, extruder [30] is disposed opposite the first mold and the second mold is in a second mold standby position and, in a second second-base position, the second mold [20] is disposed opposite and its surface opposing the first mold and the extruder is in an extruder standby position, translating second base [60] into the first second-base position in which the extruder and its die face the first mold [10];

rotating the profile mold [11] of the first mold [10] and simultaneously extruding a vulcanizable rubber mass into the annular recess of the profile mold to form an annularly-contiguous body of vulcanizable rubber that conforms to the shape of the annular recess;

translating the first base and first mold along the first direction to contact the second mold, wherein the body of vulcanizable rubber is compressed within the profile mold and caused to conform to the shape of the circular annular recess;

translating the first base and the first mold along the first direction to separate first and second molds; and removing the annular member of the tire.

\* \* \* \* \*